UNITED STATES PATENT OFFICE.

RICHARD C. FELLOWS, OF NEW YORK, N. Y.

CEMENT FOR BRUSH-MAKING AND OTHER PURPOSES.

SPECIFICATION forming part of Letters Patent No. 342,191, dated May 18, 1886.

Application filed April 26, 1884. Serial No. 129,419. (No specimens.)

*To all whom it may concern:*

Be it known that I, RICHARD C. FELLOWS, of New York city, in the county and State of New York, have invented a new and useful Improvement in Cement for Brush-Making and other Purposes, which improvement is fully set forth in the following specification.

This invention has reference to a new cement composition for securing knots or tufts of bristles in the bored holes of brush backs or stocks. This cement is to be used in powder, in which form it is to be dusted into the holes. When the holes are properly filled, the cement is liquefied in the holes, and when the knots or tufts have been inserted is then allowed to set or harden.

The method is described and claimed in my application for Letters Patent for "improvement in the manufacture of brushes," filed June 27, 1881, and officially numbered 36,910.

The present invention has for its object to produce as nearly as may be a cement perfectly adapted to this work. The essential qualities are, that it should be pulverizable, should melt at comparatively low temperature, should set quickly, and when set should have enough toughness and consistency to resist the working of the brush-knots when the brush is used, and that it should not deteriorate with time.

After much experimenting I have found that a composition of a gum-resin—such as shellac—with more or less rosin, and some Venice turpentine or boiled linseed-oil, gives the most satisfactory results. The Venice turpentine or boiled linseed-oil is used to modify or correct the brittleness of the resins. If Venice turpentine be used, it should constitute from one-fourth to one-third of the mass; if shellac be used, from one-twelfth to one-ninth. If used in excess, it renders the composition slow in setting. If used in too small quantity, it does not sufficiently modify the natural brittleness of the resins, and the bristles secured by it are likely to work loose. Fair results may, however, be obtained notwithstanding a considerable variation in the proportion used. Shellac is used as the principal adhesive agent. Comparatively tough, even without the Venice turpentine or linseed-oil, it forms an excellent basis for the cement. Rosin is too brittle to be used alone. The constant rubbing of the brush-knots soon effects such a disintegration that the knots, or
some of them, become loose. In connection with shellac it answers a good purpose, reducing the cost of the mixture, while not materially impairing the holding-power of the cement. Shellac could be used alone; but it is rather expensive. Other diluting materials may be used with it. Rosin, however, being a resin, like shellac, is preferred. Small quantities (say, ten per cent.) of chalk or other powdered mineral can be added to the composition in order to reduce the cost; but its use is not recommended. As the addition of the mineral powder raises the point at which the cement melts, it is impracticable to use a large proportion, because the high temperature necessary to melt the cement would soil or injure the bristles.

The following is considered the best mode of carrying out the invention. This mode is given by way of example, and not as limiting the invention to details thereof. Take three ounces (3 oz.) of rosin, melt it in a glue-pot of suitable size, add three ounces (3 oz.) of shellac, and when it is dissolved in the rosin add two ounces (2 oz.) of Venice turpentine or two-thirds of an ounce ($\frac{2}{3}$ oz.) of boiled linseed-oil. Mix well and turn out into water. Pulverize the cooled material, which is granular, whenever it is desired to use it. The composition could be put up in the granular form, or it could be made and sold in cakes or bricks.

Although the cement is designed and has been devised for the purpose of securing the knots or tufts of bristles in brush-stocks, yet it may of course be used for other purposes to which it may be adapted.

Having now fully described my said invention and the manner of carrying the same into effect, I claim—

1. The resinous cement composition containing a gum-resin, such as shellac, in combination with a material in the nature of Venice turpentine or linseed-oil, substantially as described, the same being practically free from mineral matters.

2. The composition of shellac, rosin, and Venice turpentine or its specified equivalent, substantially as described.

3. The powdered resin cement containing gum-resin, such as shellac, combined with material in the nature of Venice turpentine or linseed-oil, substantially as described.

In testimony whereof I have signed this specification in the presence of two subscribing witnesses.

RICHD. C. FELLOWS.

Witnesses:
A. POLLOK,
PHILIP MAURO.